Jan. 14, 1958   W. S. MITCHELL   2,819,912
QUICK DISCONNECT COUPLING
Filed Aug. 27, 1956
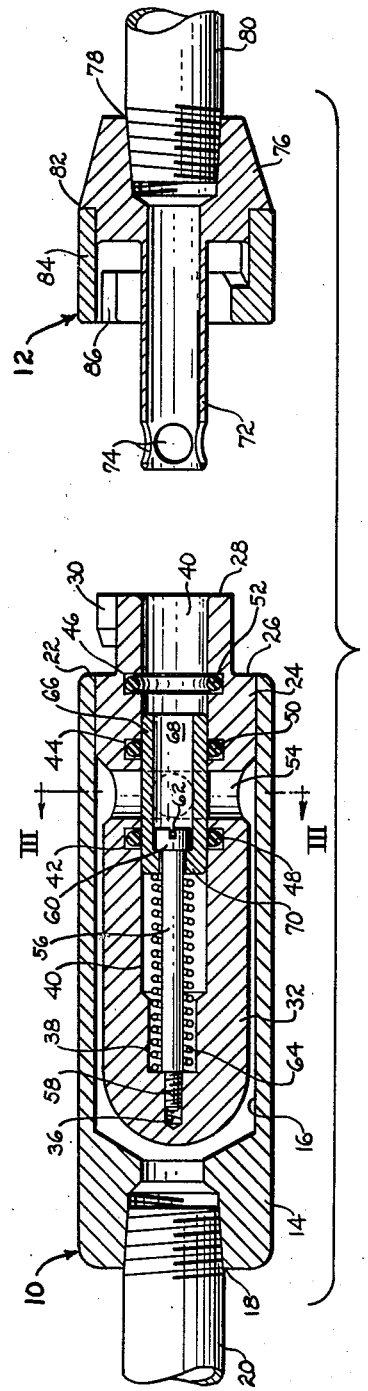
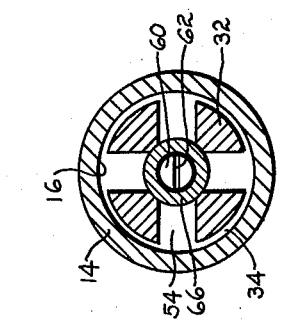
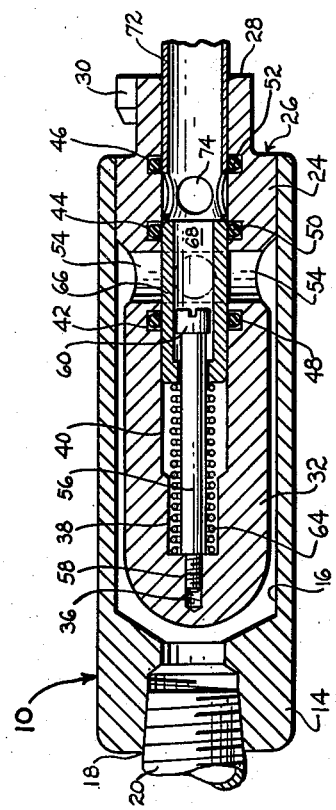
INVENTOR.
Weldon S. Mitchell.
BY
Hubert Miller
HIS ATTORNEY

United States Patent Office 2,819,912
Patented Jan. 14, 1958

2,819,912

QUICK DISCONNECT COUPLING

Weldon S. Mitchell, Andover, Kans., assignor to Boeing Airplane Company, Wichita, Kans., a corporation of Delaware Application August 27, 1956, Serial No. 606,524

5 Claims. (Cl. 284—19)

This invention relates generally to quick disconnect couplings and pertains more particularly to a coupling of this type for both positive and negative pressure lines.

The primary object of the invention is to provide a quick disconnect coupling for both positive and negative pressure lines. One use for my coupling is in oxygen lines for aircraft. In such installations it is very important that there be no leakage whatever and that the coupling be capable of sealing properly under both negative and positive pressure. More specifically, the invention contemplates the employment of a movable valve element that will not be moved by either pressure or vacuum produced forces to cause leakage.

Another object is to provide a coupling affording a sealing action when separated that will not be affected by fluctuations in line pressure, whether such pressure fluctuations be either positive or negative.

Another object of the invention is to provide a quick disconnect coupling that will automatically seal itself during either separation or connection of the coupling portions.

A further object of the invention is to provide a coupling of the foregoing character having a construction permitting a ready replacement of parts should it ultimately become necessary to do so.

The invention, together with other objects attending its production, will be more clearly understood when the following description is read in connection with the accompanying drawings, in which:

Figure 1 is a longitudinal sectional view of my coupling in a separated or detached condition;

Figure 2 is a somewhat similar view illustrating the coupling in the process of having its two separable portions connected together, and Figure 3 is a sectional view taken in the direction of line III—III of Figure 1.

Referring now in detail to the drawings, my improved coupling consists of two separable sections or portions 10 and 12. The female portion 10 comprises a cylindrical casing 14 having a bore 16 extending axially therethrough. One end 18 of the bore is narrowed and tapped for the threaded attachment of a pipe or hose 20. The other end 22 has press fitted thereinto an intermediate section 24 of a valve body or seat designated generally by the numeral 26. Integrally formed on the body 26 is a connecting boss 28 equipped with a preferred number of lugs 30. The body 26 also includes an inwardly directed section 32 of somewhat smaller diameter than the bore 16, thereby providing an annular passage 34 between the casing 14 and the body 26.

The fixedly mounted body 26 has a stepped bore composed of a tapped section 36, an intermediate untapped section 38 of one diameter and an untapped section 40 of larger diameter. The larger diameter bore section 40 is provided with a trio of axially spaced annular grooves 42, 44 and 46. Contained in each groove 42, 44, 46 is a resilient O-ring 48, 50 and 52, respectively. The valve body 26 is further formed with a plurality of radially extending ports 54 located intermediate the grooves 42, 44.

A spring guide 56 has one end 58 thereof threadedly received in the tapped bore 36. The other or opposite end of the guide 56 is formed with an enlarged head 60 provided with a transverse screwdriver slot 62. The intermediate or shank section of the guide 56 has circumscribed thereabout a coil spring 64, the guide constraining said spring for expansion or compression in an axial direction.

A valve head in the form of a piston 66 is slidably received in the bore section 40, the cylindrical surface thereof frictionally engaging the O-rings 48, 50 in one position. The piston 66 is provided with a bore 68 of one diameter. The bore 68 narrows abruptly at the inner end of the piston to form an annular flange 70. The internal diameter of the centrally directed flange 70 approaches that of the shank of the guide 56 but provides sufficient clearance with respect thereto so that the piston 66 may be reciprocally moved. It will be noted, however, that the head 60 is of sufficient diameter so as to limit outward movement of the piston 66 by virtue of the flange 70 abutting thereagainst. At this time, it will be explained that the coil spring 64 is placed under compression when initially installed, thereby supplying an outward bias to the piston 66. As mentioned above, though, the head 60 limits the distance that the spring 64 can move the piston 66.

Describing now the male portion 12, this portion comprises a tubular probe 72 having a diameter corresponding to that of the piston 66. The penetrating end of the probe 72 is provided with a plurality of radially directed apertures 74 and its opposite end is enlarged so as to form a base 76. The base is drilled and tapped at 78 for the attachment of a second pipe or hose 80. Further, the base 76 is rabbeted at 82 for the securement of a collar 84 thereto. Internally, the collar 84 is provided with a number of grooves 86 having inwardly offset portions, one for each lug 30. The lugs 30 and grooves 86 constitute a conventional goose neck connection and coact in an interlocking manner that need not be described in further detail.

Before describing the operation of my quick disconnect coupling it might be well to explain the way in which the parts making up the female portion 10 are assembled. As already stated, the intermediate section 24 of the valve body 26 is press fitted within the end 22 of the bore 16. Not only does this press fit provide a permanent mode of securing the body 26 in place, but it assures a fluid tight joint in this region. Of more interest to the user of my coupling is the way in which the parts subject to wear may be assembled and replaced when necessary. In assembly O-rings 48, 50, 52 are first inserted into their respective annular grooves 42, 44 and 46 through the bore 40. One end of spring 64 is next seated in bore 38. Valve head 66 is then manually pushed through bore 40 to the position shown in Fig. 1. The spring guide is then screwed into its seat 36 and the assembly is complete. It will be understood that both the valve head and the O-rings may be easily and quickly replaced.

In operation, the portions 10 and 12 are brought together from their separated positions of Figure 1. As the probe 72 is forced inwardly, it contacts the outer end of valve head 66. Further inward movement of the probe 72 moves valve head 66 inward, as in Figure 2. It will be observed that O-ring 46 seals around probe 72 before the seal between O-ring 44 and valve head 66 is broken. This assures freedom from leakage during the coupling process. As probe 72 penetrates further, O-ring 44 also seals around probe 72, and valve head 66 is moved sufficiently to afford open communication between ports 54 and the bore of probe 72. A relative twisting of the sections 10 and 12 will cause the lugs 30 to become locked in the offset portions of the grooves 86. Coupling sections 10 and 12 will thus be retained in their coupled or connected condition.

From the above description and the accompanying drawings it will be understood that neither a positive nor a negative pressure in pipe 20 can possibly apply a force on valve head 66 which will tend to move that head in either direction. Since the head is normally maintained in its Figure 1 position by spring 64 when the two coupling sections are uncoupled, section 10 of the coupling will always maintain a leak proof seal against positive pressure or vacuum.

Having described the invention with sufficient clarity to enable those familiar with this art to construct and use it, I claim:

1. A quick disconnect coupling comprising a casing having a bore extending axially therethrough, a valve body having a first section thereof projecting from said casing to form a connecting means and a second section thereof residing in said bore, said body being further provided with a bore extending through said first section and partially through said second section and a radially extending port providing communication between the bore of said valve body and the bore of said casing, a piston reciprocably disposed in the bore of said body, a coil spring contained in the bore of said body and abutting the inner end of said piston to urge said piston into a blocking relation with said port, and a spring guide extending through said spring having one end anchored to the closed end of said valve body and means at its other end for limiting outward movement of said piston under the influence of said spring; and a male portion including a tubular probe having a diameter corresponding to that of said piston and adapted at one end to abut said piston to overcome the action of said coil spring, said one end of the probe being provided with at least one radially directed aperture registrable with said port, and a connecting collar associated with said probe providing a connecting means engageable with said first connecting means.

2. A quick disconnect coupling comprising: a female portion including a casing having a bore extending axially therethrough, a valve body having a first section thereof projecting from said casing to form a connecting means and a second section thereof residing in said bore, said body being further provided with a bore extending through said first section and partially through said second section, a trio of axially spaced annular grooves and at least one radially extending port disposed between the innermost pair of said grooves providing communication between the bore of said valve body and the bore of said casing, a resilient O-ring disposed in each of said annular grooves, a cylindrical piston reciprocably disposed in the bore of said body, a coil spring contained in the bore of said body and abutting the inner end of said piston to urge said piston outwardly, and a spring guide extending through said coil spring having one end anchored to the closed end of said valve body and means at its other end for limiting outward movement of said piston under the influence of said spring; and a male portion including a tubular probe having a diameter corresponding to that of said piston and adapted at one end to abut said piston to overcome the action of said coil spring, said one end of the probe being provided with at least one radially directed aperture registrable with said port, and a connecting collar associated with said probe providing a connecting means engageable with said first connecting means.

3. A quick disconnect coupling comprising: a female portion including a casing having a bore extending axially therethrough, one end of said casing being adapted for the attachment of a hose thereto, a valve body having an intermediate section fitting tightly within the other end of said bore provided with an outwardly directed connecting boss and an inwardly directed section of smaller diameter than said bore so as to form an annular passage between said casing and said body, said body being further provided with a bore extending through said boss and partially through said smaller diameter section so that the inner end of the valve body is closed, a trio of axially spaced annular grooves and a plurality of radially extending ports disposed between the innermost pair of said grooves providing communication between the bore of said valve body and said annular chamber, a resilient O-ring contained in each of said annular grooves, a cylindrical piston having a bore and an annular flange at the end thereof nearer the closed end of said valve body, a coil spring contained in the bore of said body and abutting the flanged end of the piston to bias said piston outwardly, and a spring guide concentrically disposed within said coil spring having one end threadedly connected to the closed end of said valve body and an enlarged head at its other end received in the bore of said piston, said head being engageable with said flange to limit movement of said piston in an outward direction; and a male portion including a tubular probe adapted to frictionally engage the outermost O-rings upon insertion into said female portion and to abut said piston to overcome the action of said coil spring bearing against the opposite end of said piston, the penetrating end of said probe being provided with a plurality of radially directed apertures registrable with said ports and the opposite end of said probe having a base adapted for the attachment of a second hose, thereto, and a connecting collar member fixed to the base of the probe and extending toward the penetrating end of said probe in annularly spaced relation with respect to said probe for detachable engagement with said boss.

4. A quick disconnect coupling comprising: a female section including a casing having a bore extending axially therethrough; an elongated valve body having one of its ends sealed in and closing one end of the bore in the casing, the remaining portion of the valve body being of reduced diameter and projecting into the casing bore and cooperating therewith to define an annular flow passage, said valve body having a blind bore open at that end of the body which is sealed in the casing bore; a wall port in the valve body affording communication between its blind bore and said annular flow passage; a piston reciprocable in the blind bore of the valve body to open and close said wall port; a coil spring in the bore of the valve body bearing against the closed end of the bore and against the piston to urge the piston into port closing position; means for limiting the outward movement of said piston under the influence of said spring; a male section including a tubular probe having a diameter corresponding to that of said piston and insertable into the open end of the blind bore to contact and move said piston against the action of said spring to open said side wall port; a port in the probe near its bore penetrating end for registry with the port in the valve body after the pitson has been moved away from its port closing position; and means for detachably connecting said male and female sections.

5. A quick disconnect coupling comprising: a female section including a casing having an axial bore extending therethrough; an elongated valve body having one of its ends sealed in and closing one end of the bore in the casing, the remaining portion of the valve body projecting into the casing bore and cooperating therewith to define an annular flow passage, said valve body having a blind bore open at that end of the body which is sealed in the casing bore; a wall port in the valve body affording communication between its blind bore and said annular flow passage; a valve head reciprocable in the blind bore of the valve body to open and close said wall port; means urging said valve head toward a port closing position; a male coupling section including a tubular probe of a size and shape to complementally fit and slide into the blind bore of said female section, the bore penetrating end of said probe being adapted to contact said valve head and move it to open the port in the valve body; and a lateral port near the bore penetrating end of said probe for registry with the wall port in the valve body after the valve head has been moved away from its port closing position.

References Cited in the file of this patent

UNITED STATES PATENTS

| | | |
|---|---|---|
| 1,093,576 | McNutt | Apr. 14, 1914 |
| 2,131,271 | Coles et al. | Sept. 27, 1938 |
| 2,370,182 | Morrow et al. | Feb. 27, 1945 |